United States Patent [19]

Gruber

[11] 4,051,402
[45] Sept. 27, 1977

[54] SHELL ROTOR DIRECT CURRENT GENERATOR

[76] Inventor: John R. Gruber, 1421 E. 32nd St., Cleveland, Ohio 44114

[21] Appl. No.: 627,664

[22] Filed: Oct. 31, 1975

[51] Int. Cl.² .................................. H02K 1/22
[52] U.S. Cl. ...................................... 310/266
[58] Field of Search ............... 310/266, 152, 154, 155, 310/156, 158, 177, 166–168

[56] References Cited

U.S. PATENT DOCUMENTS

| | | | |
|---|---|---|---|
| 3,152,275 | 10/1964 | Aske | 310/266 |
| 3,290,528 | 12/1966 | Adler et al. | 310/266 |
| 3,462,626 | 8/1969 | Kluss | 310/266 X |
| 3,532,916 | 10/1970 | Fisher | 310/266 |
| 3,549,923 | 12/1970 | Kurakin | 310/266 |
| 3,555,325 | 1/1971 | Inariba et al. | 310/266 X |
| 3,629,666 | 12/1971 | Abbott | 310/266 X |
| 3,668,452 | 6/1972 | Hu | 310/266 |
| 3,864,588 | 2/1975 | Inaba | 310/266 |

*Primary Examiner*—Mark O. Budd
*Attorney, Agent, or Firm*—Fay & Sharpe

[57] ABSTRACT

A direct current generator including a cylindrically shaped shell rotor having a multiplicity of longitudinally aligned conducting segments adapted to be displaced relative to permanent magnet pole pairs for the generation of electrical current. The permanent magnet pole pairs are comprised of magnetic members arranged to form an axial annular air gap. The longitudinally aligned conducting segments of the cylindrically shaped shell rotor are disposed within the axial air gap and are displaced relative to the permanent magnet pole pairs. The relative displacement of the conducting segments of the cylindrically shaped shell rotor in the magnetic flux created by the magnet pole pairs induces electrical current in the conducting segments, which current is communicated by means of commutators to electrical conductors.

8 Claims, 3 Drawing Figures

SHELL ROTOR DIRECT CURRENT GENERATOR

BACKGROUND OF THE INVENTION

This invention is concerned with dynamoelectric machines and more particularly with commutator type generators for supplying speed responsive direct current. Specifically, the invention relates to a direct current generator having a shell rotor displaced relative to permanent magnet pole pairs. More particularly, the invention is concerned with a direct current generator including a cylindrically shaped shell rotor having a multiplicity of longitudinally aligned copper segments in which said segments current is induced when the segments are displaced relative to permanent magnet pole pairs.

Direct current generators have conventionally embodied a rotor comprised of coil windings in which currents are induced by a relative displacement of the windings with respect to a magnetic field. These coils are conventionally wound around a thin cylindrical nonmagnetic member to form a rotor as is typically shown in Hayes, U.S. Pat. No. 2,860,267. Alternately, direct current generator rotors have been constructed of a tubular nonmagnetic material supporting a plurality of windings of the printed circuit type which are deposited on the tublar nonmagnetic material.

Both of these prior art rotor constructions present several obvious problems. In the case of the coil-wound rotor, the cross sectional area is limited by two factors. The first factor is that for a given pole pair gap, the size of the coil conductor cross-sectional area is limited by the necessity of having a nonconducting supporting material. The second factor reducing cross sectional area is the configuration of the coils. That is, coils having a circular cross section do not yield the most efficient utilization of space within the magnet pole pair gap. In the case of the printed circuit type of windings, the cross-sectional area of the conductors is limited not only by the necessity of having a non-conducting supporting material, but also by the inherent thinness of the printed circuit type of windings.

The present invention represents an improvement over the prior art in that maximum use is made of the magnet pole pair air gap, resulting in a direct current generator capable of generating large currents at high efficiencies.

SUMMARY OF THE INVENTION

This invention relates to a dynamoelectric machine for the generation of direct current having a shell rotor, which rotor is disposed between and displaced relative to permanent magnet pole pairs. The shell rotor is comprised of a conducting cylinder having longitudinal slots therein substantially the entire length of the cylinder with the slots extending through one edge of the cylinder, thereby forming conducting segments separated by the slots and connected at one end of the cylinder by that portion of the cylinder not slotted, thus forming a common conducting band. An insulating member is affixed to the conducting strips in proximity to the edge of the conducting cylinder having the slots extending through the edge thereof, thereby forming a rotor assembly which may be rotated relative to a magnetic field for the generation of electrical current.

DESCRIPTION OF THE PREFERRED EMBODIMENT

Figure 1:
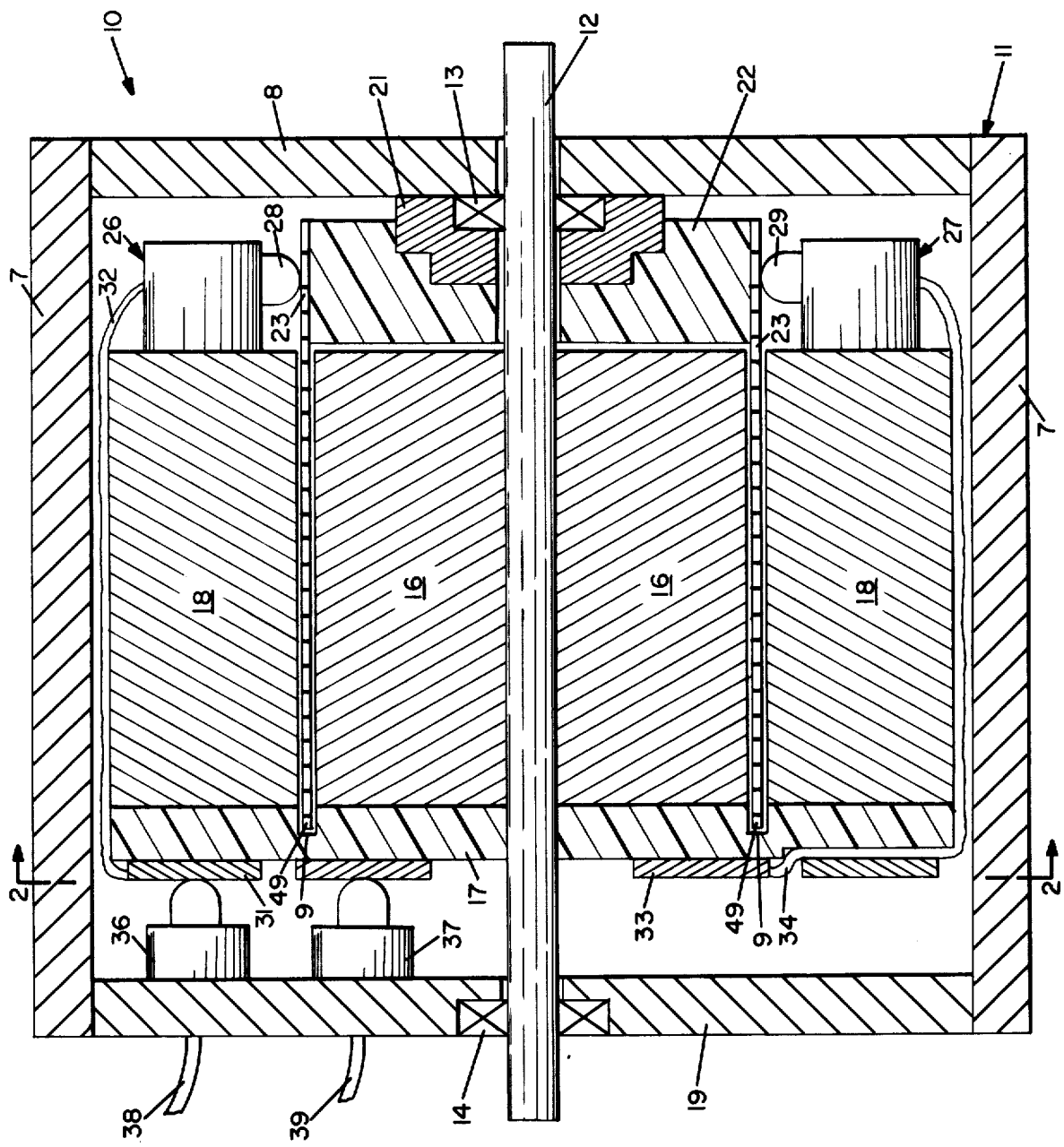
FIG. 1 is a full sectional view of the preferred embodiment taken on the line 1—1 of FIG. 2 and showing in detail the construction thereof.

Referring to FIG. 1, there is shown a DC generator generally designated as 10. The DC generator 10 is comprised of a frame structure 11 having parallel plate members 8 and 19 with suitable openings for shaft 12. The shaft 12 is journalled in bearings 13 and 14 to allow for the free rotation of the shaft 12. The frame structure 11 may be mounted by affixing either the plate members 8 and 19 or the housing 7 to a stationary member which is not shown.

Fixedly attached to the shaft 12 is inner pole assembly 16 which consists of a permanent magnet member having, in the preferred embodiment, eight integrally formed longitudinally disposed radially outward facing poles, said poles having alternating polarity. The details of construction of the inner pole assembly 16 are more clearly shown in FIG. 2.

Attached to the inner pole assembly 16 by means of an insulating member 17 is outer pole assembly 18. The insulating member 17 has a circular slot 9 therein. Disposed within the slot 9 is common conducting band 49 of shell rotor 23. Outer pole assembly 18 is comprised of a permanent magnet having, in the preferred embodiment, eight integrally formed longitudinally disposed radially inward facing poles, said poles having alternating polarity.

Figure 2:
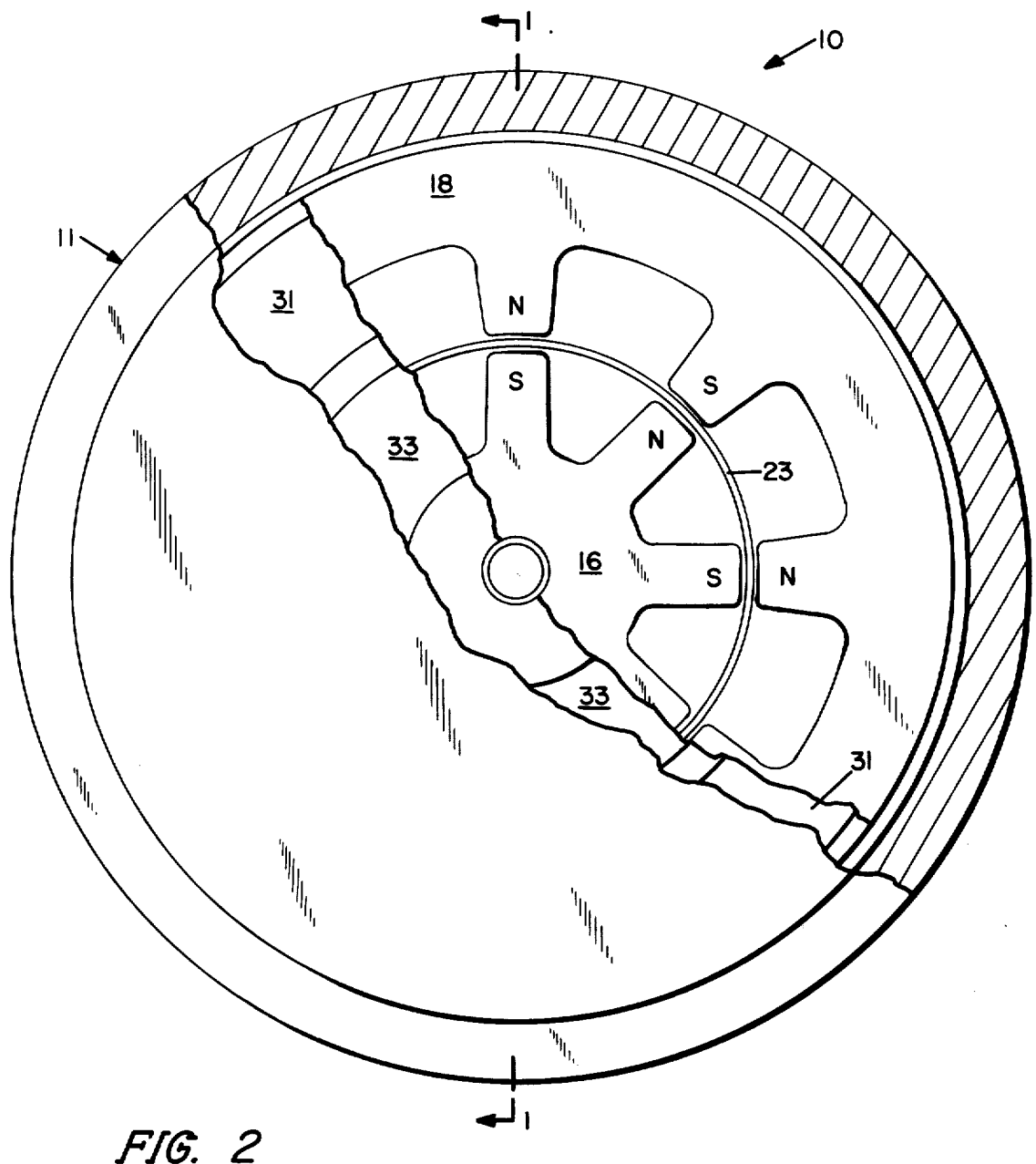
FIG. 2 is an end view of the preferred embodiment shown in FIG. 1 looking in the direction indicated by the arrows 2—2 of FIG. 1 with portions broken away to illustrate the details of construction.

It should be noted, as most clearly shown in FIG. 2, that the poles of the inner pole assembly 16 are proximately radially located relative to poles of the opposite polarity of the outer pole assembly 18. A small distance is maintained between the poles of the inner pole assembly 16 and the poles of the outer pole assembly 18, thus forming an air gap between the poles of the pole assemblies 16 and 18. Because of the close proximity of poles of opposite polarity, a relatively strong magnetic field is formed in the air gap between the poles of the pole assemblies 16 and 18. This relationship between the poles of the pole assemblies 16 and 18 is maintained by insulating member 17 which requires the inner and outer pole assemblies 16 and 18 to rotate together with the shaft 12.

Referring again to FIG. 1, there is shown a bearing 13 affixed to the frame structure 11 by means of flange 21 which is secured to the frame structure 11. Attached to the flange 21 is an insulating member 22 which may be composed of Bakelite (Bakelite is a trademark of the Bakelite Corporation) or a similar insulating material. The insulating member 22 supports the shell rotor 23 and electrically isolates the shell rotor 23 from its supporting structure.

It can be readily seen that the shell rotor 23 is nonrotatably carried by the frame structure 11, and is physically interposed between the inner and outer pole assemblies 16 and 18. The shell rotor 23 is shown in more detail in FIG. 3.

In the preferred embodiment, the shell rotor is comprised of a copper tube having a 15.24 centimeter (6 inch) outer diameter, a 13.97 centimeter (5½ inch) length, and a 1.27 millimeter (0.050 inch) wall thickness. The copper tube 56 has 80 axially disposed slots therein, typically shown at 57. The slots 57 run substantially the entire length of the tube 56 with the slots 57 extending through one edge of the tube 56 but not completely through the opposite edge of the tube so that all 80 segments formed by the slots 57 are connected by a common conducting band 49. The common conducting band 49 is disposed within the slot 9 of the insulating member 17 and is hence unaffected by the magnetic field created by pole assemblies 16 and 18. It may be observed that the 80 slots 57 in the tube 56 result in 80 conducting segments being formed. Although a tube is used in the construction of the preferred embodiment, the shell rotor may alternately be constructed of individual conducting segments being in electrical communication at one end thereof.

As shown in FIG. 1, rotor commutator brush assemblies 26 and 27 are attached to the outer pole assembly 18 and rotate therewith. The commutator contacts 28 and 29 of rotor commutator brush assemblies 26 and 27 respectively are in electrical communication with the shell rotor 23. Likewise the contacts 28 and 29 are in electrical communication, by means of conductors 32 and 34, with slip rings 31 and 33 respectively. The slip rings 31 and 33, electrically isolated from each other, are in turn in electrical communication with brush assemblies 36 and 37 repectively, which electrically communicate with conductors 38 and 39. It can now be readily appreciated that there is provided a means for allowing the shell rotor 23 to electrically communicate with conductors 38 and 39 and that any currents induced in the shell rotor 23 may thus be communicated for use outside of the generator 10.

Although, only two rotor commutator brush assemblies are shown in the drawings, it is to be understood that the number of rotor commutator brush assemblies is to be equal to the number of pole pairs, which is eight in the preferred embodiment. Similarly, as would be obvious to one skilled in the art, adjacent rotor commutators should be in electrical communication with different slip rings or adjacent rotor commutators depending on the desired output.

Figure 3:
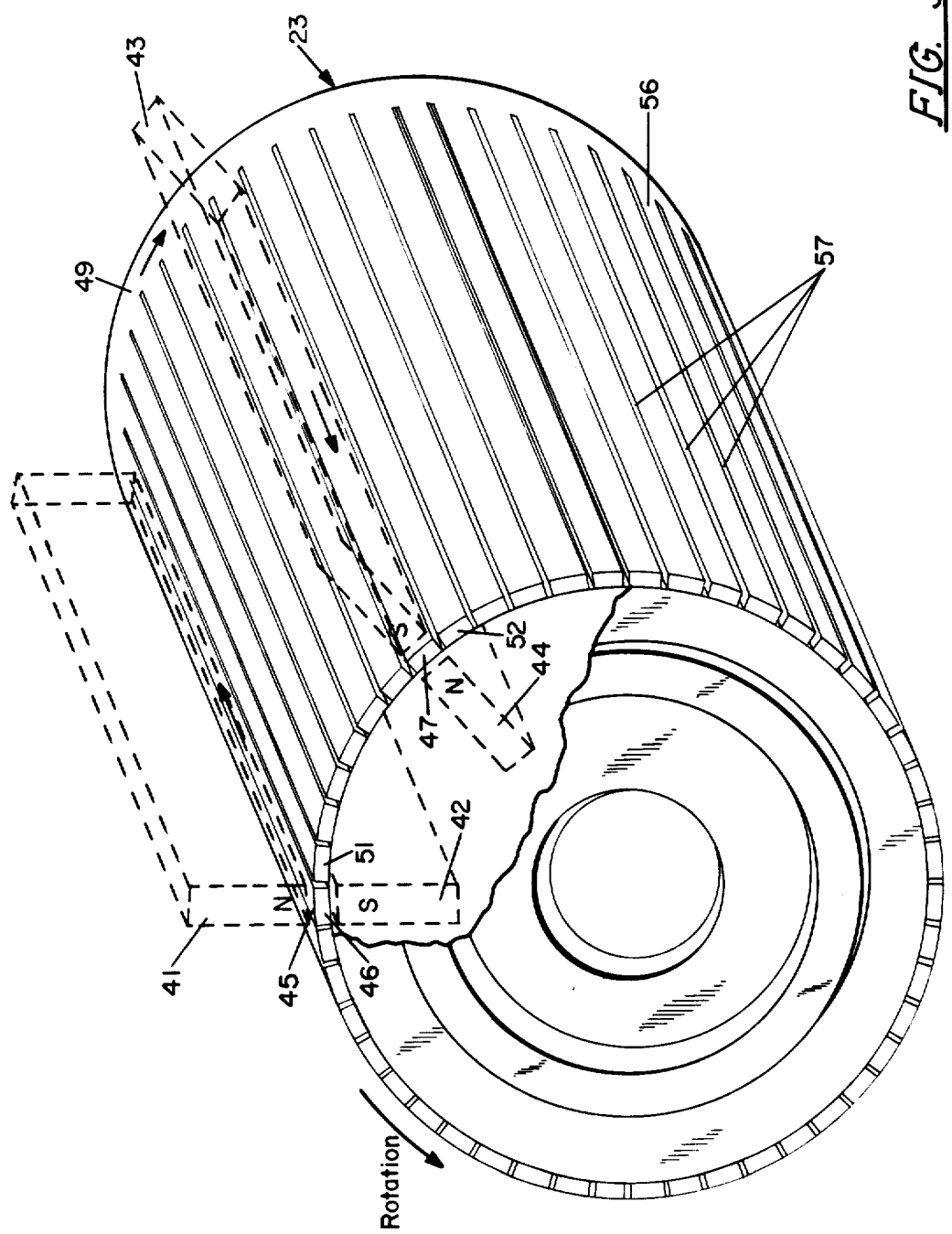
FIG. 3 is a partial pictorial view of the shell rotor with the magnetic members shown schematically to more fully illustrate the principles of operation of the invention.

The principle of operation of the generator can be most readily understood by referring to FIG. 3, where there is shown shell rotor 23 and permanent magnet poles schematically shown as 41, 42, 43 and 44. Permanent magnet poles 41 and 42 are radially disposed having their ends of opposite polarity proximately located such that an air gap 45 is formed between the proximately located edges of the permanent magnet poles 41 and 42. As a result of the proximate location of permanent magnet poles of the opposite polarity 41 and 42, a magnetic flux field is created in the air gap 45 between the permanent magnet poles 41 and 42.

A similar structure including permanent magnet poles 43 and 44 creates a similar magnetic flux field in the air gap therebetween. However, it should be observed that the magnetic flux field created between permanent magnet poles 43 and 44 has its lines of flux oriented in the opposite radial direction as those created in air gap 45. This opposite orientation of the lines of flux is a result of the permanent magnet poles 43 and 44 having the opposite relative orientation with respect to permanent magnet poles 41 and 42.

Although only two permanent magnet pole pairs 41, 42 and 43, 44, are shown, it is to be understood that any even number of pole pairs greater than two may be used. The preferred embodiment utilizes eight pole pairs radially disposed about a central axis. However, a larger number of pole pairs may be used to achieve a greater output current.

When the permanent magnet poles 41, 42, 43 and 44 are rotated together relative to the shell rotor 23 in the direction indicated by the arrow, there is a current generated within the shell rotor 23 as indicated by the arrows on the shell rotor 23. The current is produced as a result of the rotor segments cutting the lines of flux created by the permanent magnet pole pairs.

As shown in FIG. 3, the rotor segment 46 is displaced relative to the permanent magnet poles 41 and 42 thereby cutting the lines of flux created in the air gap therebetween. The resulting generated current is in the direction towards the common conducting band 49, as indicated by the arrows. Simultaneously, the rotor segment 47 is displaced relative to the permanent magnet pole pair 43 and 44, thus cutting the lines of flux created in the air gap therebetween. The current generated in rotor segment 47 is opposite in direction to that generated in rotor segment 46 because of the different arrangement of the permanent magnet poles. There is, therefore, a flow of current through the rotor segment 46, along the common conducting band 49, and subsequently through rotor segment 47. As can be readily appreciated, there will be a generation of current induced by the relative motion between the shell rotor 23 and the permanent magnet poles 41, 42, 43 and 44. Brushes (not shown in FIG. 3) are provided to obtain the current from the conducting segments.

When the rotor segments 46 and 47 have completely passed through the flux lines generated by pole pairs 41, 42 and 43, 44, rotor segments 51 and 52 will begin to pass through the flux lines, thereby inducing current in the rotor segments 51 and 52 similar to the manner in which the current was induced in the rotor segments 46 and 47. It can be readily observed that each adjacent rotor segment to the prior rotor segment passing through the pole pairs will be used to induce current within the rotor segment so that for a relative displacement of one revolution between the pole pairs and the shell rotor, there will be induced in the segments of the shell rotor 23, 80 current pulses for each pole pair. The slip rings 31 and 33, (shown in FIGS. 1 and 2) convert the current pulses to a substantially constant current output as conventionally done in DC generators.

The preferred embodiment may be operated by applying a mechanical force to the shaft 12 to impart rotation thereto. The rotation of the shaft 12 also rotates inner and outer pole assemblies 16 and 18 which causes currents to be induced in the shell rotor 23. The currents induced in shell rotor 23 may be drawn from the generator 10 by means of conductors 38 and 39 for useful work. The angular momentum of the pole assemblies 16 and 18 act as a flywheel to provide for smooth operation of the generator.

Although the invention has been illustrated using a generator having eight pole pairs and having a shell rotor constructed from a tube, the invention is not limited to this embodiment and may consist of a generator having any even number of pole pairs having a shell rotor constructed from individual conducting segments.

The invention is not to be necessarily limited to the specific construction illustrated and described since such construction is only intended to be illustrative of the principle of operation of the means presently devised to carry out said principle. It is to be considered that the invention comprehends any minor changes in construction that may be permitted within the scope of the disclosure.

I claim:

1. A current generator comprising in combination:
   a. a pair of magnetic members each comprising an annularly arranged series of alternate magnetic poles, said members being spaced axially from each other to define therebetween an annular axial air gap;
   b. a cylindrical rotor mounted for continuous rotation within said axial air gap and formed of longitudinally aligned non-ferrous conducting segments, said segments being separated by an air gap a substantial portion of the longitudinal length of said conducting segments, said conducting segments further being in electrical communication at one end thereof and having commutator means at the opposite end thereof; and
   c. means for maintaining a relative velocity between said cylindrical rotor and said magnetic members.

2. The current generator of claim 1, wherein:
   said magnetic members are comprised of permanent magnets.

3. In an electrical generator, a rotor structure comprising:
   a non-ferrous cylindrical tube mounted for continuous rotation within an annular air gap and formed of longitudinally aligned conducting segments, said segments being separated by an air gap a substantial portion of the longitudinal length of said conducting segments, said conducting segments further being in electrical communication at one end thereof, said conducting segments having commutator means at the other end thereof.

4. A shell rotor for an electrical generator including a magnetic structure having an air gap, comprising:
   a. spaced cylindrically positioned non-ferrous conducting strips axially disposed within said air gap;
   b. an insulating member affixed to said conducting strips in proximity to one end of said cylindrically positioned conducting strips;
   c. a conducting member affixed to said conducting strips in proximity to the other end of said conducting strips for maintaining said conducting strips in their spaced cylindrically disposed relationship and for providing electrical communication between said conducting strips; and
   d. commutator means associated with the end of said conducting strips having said insulating member affixed thereto.

5. A shell rotor for an electrical generator including a magnetic structure having an air gap, comprising:
   a. a conducting tube mounted for continuous rotation within said air gap and formed of longitudinally aligned conducting segments, said segments being separated by an air gap a substantial portion of the longitudinal length of said conducting segments, said conducting segments further being in electrical communication at one end thereof;
   b. an insulating member affixed to said conducting strips in proximity to the edge of said tube opposite the end of the segments in electrical communication, said insulating member supporting said conducting tube; and
   c. commutator means associated with the end of said conducting strips having said insulating member affixed thereto.

6. The shell rotor of claim 5, wherein:
   said conducting tube is comprised of a conducting cylinder having axial slots therein substantially the entire length of said cylinder with said slots extending through one edge of said cylinder.

7. The shell rotor of claim 6, wherein:
   the conducting cylinder is composed of a non-ferrous conducting material.

8. The shell rotor of claim 6, wherein:
   the conducting cylinder is composed of copper.

* * * * *